Sept. 10, 1929.  M. J. HUGGINS  1,727,344
CURRENT FLOW REGULATING MEANS
Original Filed Feb. 3, 1925
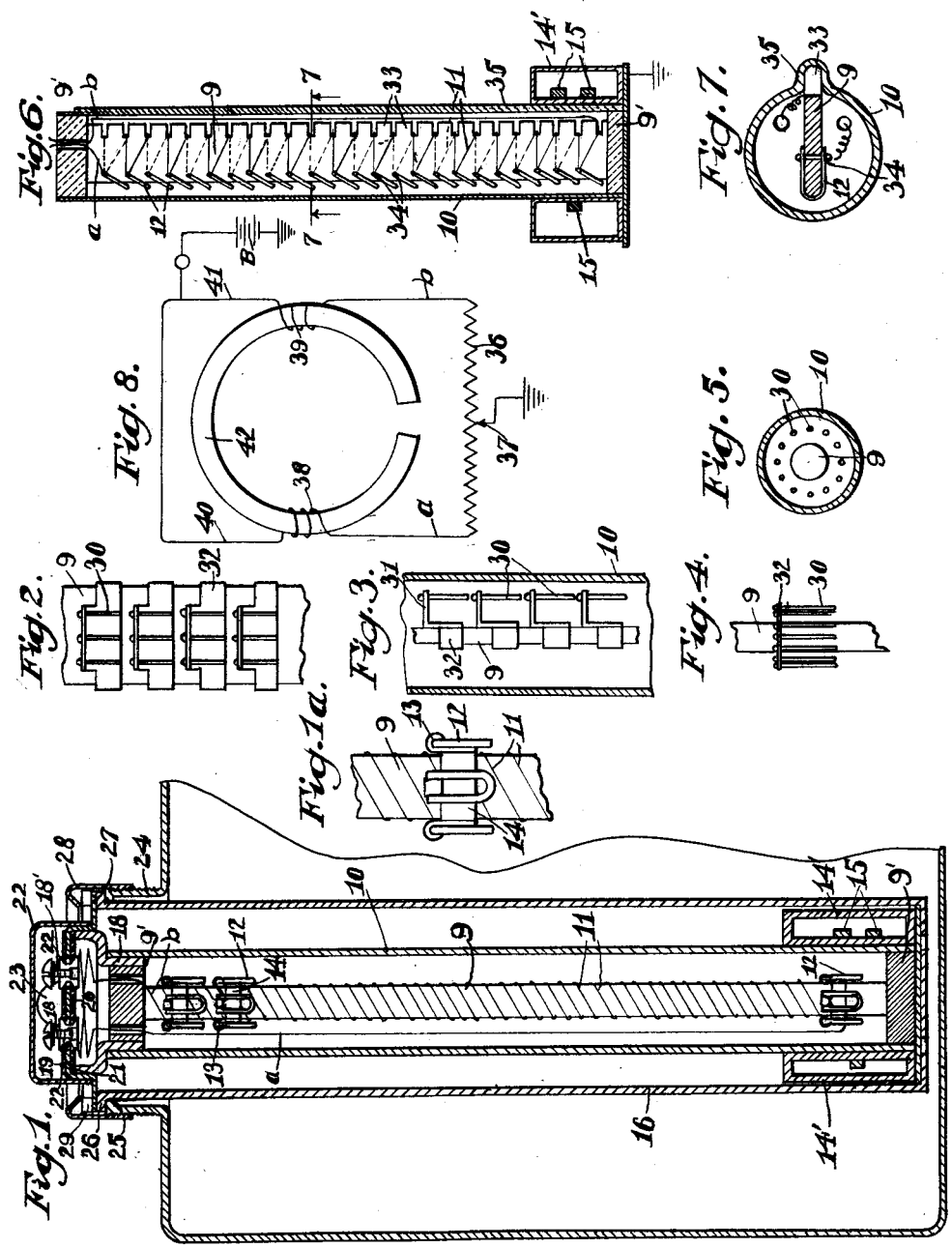
Inventor
Merion J. Huggins
By his Attorney John O. Seifert Patented Sept. 10, 1929.

1,727,344

UNITED STATES PATENT OFFICE.

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE.

CURRENT-FLOW-REGULATING MEANS.

Application filed February 3, 1925, Serial No. 6,621. Renewed May 31, 1928.

This invention relates to electric current flow regulating means for use in connection with and controlling the actuation of electric indicating instruments connected in circuit therewith and a source of electricity, such for instance as disclosed in my co-pending application Serial No. 748,441 in which the indicating instrument includes an indicator adapted to be variably positioned under the influence of a magnetic force or forces induced by the current flow, which forces are varied by and in accordance with variations in the current flow induced by introducing and cutting out resistance in the magnetic force generating means to indicate the quantity of liquid in a tank, the same being particularly adapted for use in connection with motor vehicles, for instance to indicate the quantity of gasolene in the gasolene storage tank, and the introducing and cutting out of the resistance from the magnetic force generating means of the instrument actuating means being controlled by means which rises and falls with the liquid level in the tank, and it is the object of the present invention to provide an improved constructed and arranged current flow regulating device adapted to be mounted in a tank which is simple and compact in structure and efficient in use.

A further object of the invention relates to the provision of a current flow regulating device for this purpose which is adapted to be mounted as a unitary structure in an opening in a tank and to provide improved means for removably mounting the device in the tank.

In the drawing accompanying and forming a part of this specification, Figure 1 is a longitudinal sectional view of an electric current flow regulating device constructed and arranged in accordance with the present invention and showing the same mounted in a tank with my improved means for mounting the same in the tank, only so much of the tank being shown as is essential to an understanding of the invention.

Figure 1a is an enlarged detail view to show an electric resistance element and contact means in relation thereto to connect different amounts of the resistance element in the electric circuit.

Figure 2 is a view similar to Figure 1a showing a modified arrangement of contact and means for mounting the same.

Figure 3 is a view looking at the side of Figure 2.

Figure 4 is a view similar to Figure 1a showing a modified arrangement of the contacts shown in Figures 2 and 3.

Figure 5 is a view looking at the top of Figure 4 and showing the conductor tube in relation thereto.

Figure 6 is a view similar to Figure 1 showing a modified arrangement of the electric resistance element and of contacts electrically connected thereto.

Figure 7 is a cross sectional view taken on the line 7—7 of Figure 6, looking in the direction of the arrows; and Figure 8 is a view showing in a diagrammatic manner the electrical hook up of the current flow indicating means with an indicating instrument.

In carrying out the embodiment of the invention as illustrated in Figures 1 and 1a I provide a bar 9 of insulator material with a head 9' of similar material at opposite ends whereby it is mounted in and insulated from a tube 10 of conducting but non-magnetizable material, such as brass, the heads serving as a closure for opposite ends of the tube and the tube an enclosure housing for the insulator bar and the parts, hereinafter described, carried thereby.

A resistance element is carried by said insulator bar in the form of a coil of wire 11 of electric current resistance material wound about the bar with the opposite terminals $a$ and $b$ of the resistance element passing through perforations in the upper head 9 for connection with leads to connect the resistance element in circuit with a source of electricity.

Contacts 12 of magnetizable material, which are in the nature of circuit closers, are arranged in equidistantly spaced and alined relation along the insulator bar and electrically connected to different portions of the resistance coil 11. As shown a plurality of rows of these contacts are provided, the contacts of adjacent rows being disposed laterally of each other and around the insulator bar. The contacts are bent up from wire to U form and are pivotally supported by bending the ends inward and engaging the same in opposite sides of eyes 13 formed from lugs extending laterally from a bar 14 engaged about the insulator bar and coil in electrical connection with the latter. The tube is connected in the circuit of the coil 11 and serves as a contact common to all of the contacts 12 and the circuit is closed through different portions of the coil by the contacts 12 engaging with the tube.

As stated, the invention is particularly adapted for use in connection with electric indicating instruments to ascertain the quantity of liquid in a tank, such as the gasolene storage tank of a motor vehicle, and the closing of the circuit of said coil 11 with said instrument is by and in accordance with the liquid level in the tank. For this purpose a float 14' of the hollow metallic type and of annular form is mounted on the tube 10 to have movement along the same, said float carrying a magnet 15 of the split ring type with the ends or pole portions offset longitudinally of the float, said magnet being mounted upon the core of and within the float. As the float rises or falls with the liquid level in the tank the contact or contacts 12 opposite to the poles of the magnet will be attracted by the magnet and moved into engagement with the tube 10 thereby closing the circuit through the tube, the contact 12 in engagement therewith and through that portion of the resistance coil with which the contact is connected.

To prevent sudden movement of the float which may be caused by the surging of the liquid in the tank when utilized in connection with a motor vehicle as the vehicle moves along the road, the tube 10 with the float and other parts carried thereby are enclosed in a tubular housing 16 having the lower end or bottom closed and arranged with perforations to place the interior of the housing in liquid communication with the tank adjacent the bottom thereof. By this arrangement the liquid in the tubular housing will be maintained at all times at a level which is a mean level of the liquid in the tank.

The tubular housing 16 is mounted in and suspended from an opening in the tank by means which also serves as a closure for said opening. This mounting comprises a tubular member 18 having two diameters, the tube 10 being connected to the portion of less diameter by engaging the same in the end of the tube. The opposite end of said tube is closed by means which also serves as a carrier for a pair of binding posts 18' for the connection of the coil terminals a and b and to insulate said posts from the device. For this purpose there is provided a pair of juxtaposed plates 19, 20 of insulator material to be engaged at the outer and larger end of the member 18, with a mounting member 21 interposed between said insulator disks, said mounting member being of inverted cup shape, and having perforations to aline with the perforations in the plates 19, 20 but of greater diameter. The insulating plates are united into a unitary structure with the cup member 21 by eyelets 22 of the same diameter as the perforations in the insulator plates, and as the one end of the eyelets is upset a portion of the material about the perforations of the insulator plates will be squeezed about the edge of the opening in the member 21 and thereby effectively insulate the eyelets from said member; the binding posts or screws 18' are threaded into the eyelets. A cap 22 is engaged over the binding posts and has a slip joint connection with the cup member 21, the cap having an opening 23 for the passage of current conductors connected to the binding posts. An upwardly extending and externally threaded flange 24 is arranged about the tank opening the outward edge portion of which flange is turned inwardly, as at 25, to form a seat for the engagement of a laterally flanged portion 26 of the housing 16 to support the housing, the housing being engaged upon the inturned portion of the flange 24 and a laterally extending flange 27 of the cap 21 by a coupling member 28 having threaded connection with the flange 24 and the inwardly extending portion of said coupling bearing upon the cup-flange 27 with an interposed packing 29.

In Figures 2 and 3 I have shown a modified arrangement of the contacts for closing the circuit through the tube 10 and different portions of the resistance element, said contacts, as shown in said figures comprising headed pins 30 loosely engaging in perforations in a laterally extending flange 31 of carriers 32 for said contacts and whereby the contacts are mounted upon the insulator bar 9, said bar instead of being circular in cross section being in the nature of a flat bar of rectangular shape in cross section. As the magnet 14' comes opposite the pins as it is moved along the tube 10 it will attract and move the free ends of the pins into engagement with the said tube.

In Figures 4 and 5 I have illustrated a further modified arrangement of the support for the pin contacts 30. Instead of the pins being arranged in rows extending laterally of the insulator bar and in a spaced and alined row extending longitudinally of the bar, the carrying bar is of circular shape in cross section and the support 32 is arranged with an annular flange having perforations therein for the engagement of the pins so that the pins are disposed about the supporting bar 9.

In Figures 6 and 7 I have shown a further modified arrangement of mounting for the U-shaped contacts 12 shown in Figures 1 and 2 and the electrical connection thereof with the resistance element. In this arrangement the insulator carrier 9 has a flat bar of rectangular shape in cross section arranged with equi-distantly spaced notches in one longitudinal edge to provide said edge with a series of projections 33. The contacts 12 are arranged with an eye at the extremity of the legs thereof whereby they are pivotally mounted upon pins 34 fixed in and extending transversely of the insulator bar with the ends projecting from opposite sides thereof, the contacts straddling the edge of the bar and the connecting portion normally engaging with said edge of the bar by gravity. The resistance coil 11 is looped around the bar projections 33 and the extended end of alternate contact supporting pins at opposite sides of the bar, as shown in Figure 6, the coil extending from the top to the bottom of the bar. The tube 10 is arranged with the closure heads 9' in which the bar is mounted by engaging in recesses therein, and to position the bar and thereby the contacts 12 relative to the tube 10 and the tube is arranged with a longitudinal recess 35 by bulging the wall of the tube outward. The core of the float 14' is arranged with a corresponding recess for the engagement of the projection formed by the outwardly bulged portion of the tube whereby to position the float with the poles of the magnet 15 carried thereby to come opposite the contacts 12 as the float is moved along the tube.

In Figure 8 I have illustrated in a diagrammatic manner the electrical hook up of my improved electric current flow regulating means, indicated at 36, and the magnet and contacts being indicated at 37, the regulating means being connected by the leads a and b with one terminal of coils 38, 39 of an electrical indicating instrument, the opposite terminals 40, 41 of said coils being connected with a storage battery, shown in a conventional manner at B, the battery and contact maker 37 when the invention is used in connection with motor vehicle practice being grounded in the vehicle frame as shown in a conventional manner. The coils 38, 39 arranged to generate opposed magnetic forces which are adapted to act on a ring 42 of magnetizable or polarized material to move said ring in a circular path, the ring forming a part of or carrying the indicator of the indicating instrument. By this arrangement a portion of the resistance 36 is cut out of one coil, as 38, a proportional amount of the resistance will be connected into the other coil 39, thereby proportionally increasing and decreasing the values of the magnetic forces generated by the coils and thereby influencing the indicator ring 42 to move the same. In some instances the one coil, as 39, may be connected directly with the source of electricity whereby the value of the magnetic force generated by said coil will be constant. In this arrangement one terminal of the resistance 37 is grounded and the other terminal connected to the coil 38, whereby the value of the magnetic force generated by said coil will be variable relative to the value of the force generated by coil 39 and thereby controlling the movement of the indicator ring 42.

Having thus described my invention, I claim:

1. In electric current flow regulating means, a dielectric bar, a current resistance element carried by said bar to extend longitudinally thereof adapted for connection in an electric circuit, yoke shaped magnetic contacts pivotally carried by the bar and disposed in spaced relation longitudinally thereof and electrically connected to different portions of the resistance element, and an enclosure of conducting material for said dielectric bar with the resistance element and contacts connected in the circuit of the resistance element and with which closure the contacts are adapted to be brought into contact to close and connect different portions of the resistance element into the circuit.

2. In electric current flow regulating means, a bar of insulator material, a current resistance coil wound about said bar and extending for substantially the length thereof and adapted to be connected in an electric circuit, yoke shaped contacts of magnetizable material, and means to pivotally mount said contacts upon the bar in alined and spaced relation and in electrical connection with different portions of the resistance coil.

3. In electric current flow regulating means a bar of insulator material, a resistance coil wound about said bar for the length thereof and adapted for connection in an electric circuit, and U-shaped magnetic contacts pivotally carried by said bar in alined and spaced relation with the respective contacts in electrical connection with different portions of the coil.

4. In electric current flow regulating means, a bar of insulator material, a resistance coil wound about said bar for the length thereof and adapted for connection in an electric circuit, U-shaped magnetic contacts pivotally carried by said bar in alined and spaced relation with the respective contacts in electrical connection with different portions of the coil, a tube of conducting material in which the insulator bar with the coil and contacts is mounted and enclosed thereby, said tube being connected in the circuit with the coil, and magnetic means movable along the tube operative to attract the contacts to the tube to establish the circuit therethrough and connect different portions of the coil into the circuit.

5. In electric current flow regulating means, a bar of insulator material, a current resistance element carried by said bar to extend longitudinally thereof and adapted for connection in an electric circuit, magnetic contacts pivotally carried by said bar disposed about the same and in spaced relation longitudinally of the bar and electrically connected with different portions of the resistance element, and a tube of conducting material in which the bar with the resistance element and contacts is mounted, said tube being connected in circuit with the resistance element and the contacts adapted to make contact therewith to close the circuit and connect different portions of the resistance element therein.

6. In electric current flow regulating means, a bar of insulator material, a resistance element carried by and extending longitudinally of said bar and adapted to be connected in an electric circuit, and magnetic contacts carried by said bar to have movement laterally thereof, said contacts being arranged in juxtaposed relation in a direction transverse of the bar and in spaced relation longitudinally of the bar and electrically connected to different portions of the resistance element and through either one of which contacts the circuit with the resistance element is adapted to be closed.

Signed at New York city, in the county of New York and State of New York this 23rd day of January, 1925.

MERION J. HUGGINS.